United States Patent Office 2,916,460
Patented Dec. 8, 1959

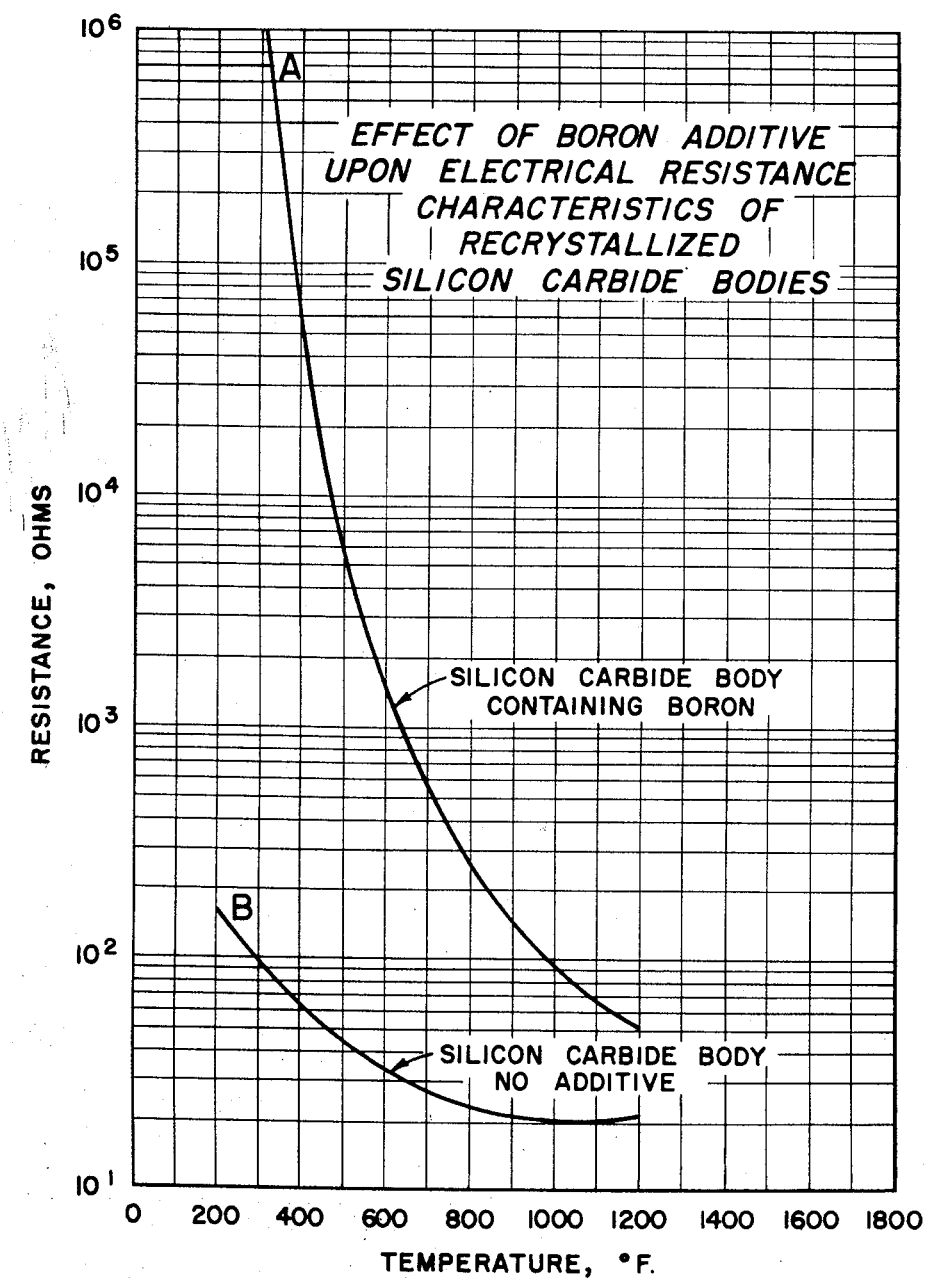

2,916,460

SILICON CARBIDE RESISTANCE BODIES AND METHODS OF MAKING SAME

Roland R. van der Beck, Jr., Grand Island, N.Y., assignor to The Carborundum Company, Niagara Falls, N.Y., a corporation of Delaware Application June 28, 1956, Serial No. 594,622

9 Claims. (Cl. 252—516)

This invention relates to electrical resistance bodies having a very high sensitivity to changes in temperature over a wide temperature range. Such bodies are hereinafter referred to as thermistors or thermistor bodies. More particularly, the invention pertains to recrystallized silicon carbide resistance bodies having a very high negative temperature coefficient of electrical resistance over a wide temperature range, the desirable thermistor characteristics of the body being derived from the presence within the crystalline structure of a small amount of a modifying agent such as boron. The invention also pertains to methods for making such bodies.

Thermistors find wide application in temperature measuring and controlling devices and their use has grown very rapidly over the last fifteen or twenty years. Although it is impossible to describe all their manifold applications, the general areas of their use can be briefly mentioned. For example, thermistors can be used to replace thermocouples, especially for use at moderate temperatures up to about 600° F. and in this application they offer several advantages over thermocouples, since they are more sensitive to temperature change than thermocouples and have greater stability. Furthermore, thermocouples produce a relatively weak signal which must be amplified to actuate controlling circuits, whereas thermistors are sufficiently sensitive to actuate relays directly, thereby reducing the cost of necessary controlling equipment. Thermistors are also used to compensate for changes in ambient temperature in order to maintain the accuracy of electrical measuring equipment over wide ranges of ambient temperature. Thermistors are also useful in time-delay applications instead of ballast or other time-delay devices for the purpose of preventing electron tube filaments from being injured by "across the line" starting.

Thermistor bodies composed of various combinations of metal oxides have been developed which are sufficiently stable and sensitive to be satisfactory for use at temperatures up to around 400–500° C. but such bodies have been unstable at higher temperatures and have consequently been limited in the scope of use. Efforts to develop a commercially useful thermistor body of acceptable stability, reproducibility, and high sensitivity in the temperature range above 400 to 500° C. have been unsuccessful although there is a definite need for a thermistor body suitable for use not only at lower ranges of temperature but at temperatures substantially above the temperatures at which existing thermistor bodies are capable of use.

It is an object of the present invention to provide a thermistor body which is capable of use at relatively high temperatures.

It is a further object to provide a recrystallized silicon carbide thermistor body having a high sensitivity in electrical resistance when subjected to changes in temperature.

It is a further object to provide methods of making silicon carbide thermistor bodies having a desirably high temperature coefficient of electrical resistance over a wide range of temperatures.

These and other objects and advantages accruing from the invention will become apparent as the description of the invention proceeds.

I have found that the addition of boron to the crystal structure of the silicon carbide of a recrystallized silicon carbide body greatly modifies the electrical resistance characteristics of the resultant recrystallized body. Specifically, I have found that the presence of boron in the silicon carbide crystal structure imparts to a recrystallized silicon carbide body made from such a modified silicon carbide, an unusually high sensitivity in electrical resistance of the recrystallized body to changes in temperature of the body and that this sensitivity is high over a wide temperature range. The amount of boron required to effect these marked changes in electrical properties of recrystallized silicon carbide bodies is very small, amounting to less than 1% of retained boron in the silicon carbide crystal structure. In fact, it is estimated on the basis of chemical analyses that the tolerance for boron in the silicon carbide lattice is in the neighborhood of 0.34% by weight.

The introduction of the addition agent into the silicon carbide crystal structure can be accomplished by either one of two different methods. One way of effecting the introduction of boron in the desired amount within the crystal structure of the silicon carbide is through the incorporation of a small amount of a boron compound, such as boric oxide or boric acid in the raw batch of silica and carbon from which the silicon carbide is made. When the boron is incorporated in the crystalline silicon carbide in the course of the manufacture of the bulk silicon carbide, the amount of boron compound added to the raw batch from which the silicon carbide is made should be maintained below the amount which will result in the simultaneous formation of boron carbide in the resultant furnace product. The exact amount of boron compound which can be tolerated in the raw batch without the formation of objectionable amounts of boron carbide in the final furnace product varies and depends to a large extent upon the time and temperature and other specific furnacing conditions. The following is an example of a raw batch suitable for the manufacture of a boron-modified silicon carbide material suitable for the making of recrystallized silicon carbide resistance bodies in accordance with the teachings of the present invention.

| | Parts by weight |
|---|---|
| Silica sand | 168 |
| Coke | 103 |
| Sawdust | 14 |
| Anhydrous boric oxide | 6.6 |

A raw batch of the above ingredients and proportions is furnaced in accordance with the conventional practices for the manufacture of bulk silicon carbide as described, for example, in Acheson, U.S. Patent 492,767. Provided that the ingredients of the raw batch are of the degree of purity normally used for the formation of a high purity, "green" grade of silicon carbide, the resulting product as modified by the presence of the boron compound consists of silicon carbide crystals which in appearance are golden to yellow-green in color when seen with transmitted light. Chemical analysis of the product resulting from the manufacture of silicon carbide from the above raw batch discloses the presence within the silicon carbide crystal structure of about 0.20% by weight boron. When the crystalline silicon carbide is crushed and graded into the desired grit sizes and the crushed material molded and fired to form a recrystallized silicon carbide body of the desired shape, the resulting recrystallized shape has an extremely high negative temperature coefficient of electrical resistance amounting to several times that of a recrystallized silicon carbide body composed of unmodified high purity silicon carbide over the same wide range of temperature.

Another way of introducing the boron modifier into the silicon carbide crystal structure is to add the boron compound in the desired amount to the raw batch of previously made granular silicon carbide from which the recrystallized silicon carbide body is formed prior to the firing operation in which recrystallization of the silicon carbide is effected. For example, addition of boric acid was made in the proportion of 8.5 grams of boric acid to 300 grams of high purity "green" silicon carbide prior to the formation of a recrystallized silicon carbide body. A recrystallized silicon carbide resistance cylindrical body ½" in length and ⅛" diameter made from such a mix had an electrical resistance at room temperature of $10^6$ ohms. A resistor of the same raw batch of silicon carbide exclusive of the boron modifying compound has an electrical resistance at room temperature in the order of magnitude of 10 ohms.

In the above described methods of introducing boron into the silicon carbide crystal structure, I have in one instance used a raw batch which in the absence of the boron compound would have formed a high purity, "green" variety of silicon carbide, and in the second instance I added the boron compound to a high purity, "green" silicon carbide. The less pure forms of silicon carbide can be similarly modified in electrical characteristics by the inclusion of boron in the silicon carbide crystal structure either at the time the silicon carbide is made or when it is later used to form a recrystallized silicon carbide body.

The following is a raw batch suitable for making recrystallized silicon carbide resistance bodies in accordance with the present invention wherein the boron compound is incorporated in the silicon carbide crystal structure during the process of recrystallization of the silicon carbide body. The particle or grit sizes specified are according to U.S. Standard Sieve specifications.

| | Parts by weight |
|---|---|
| 40–100 grit size silicon carbide | 160 |
| 100–140 grit size silicon carbide | 120 |
| 150–200 grit size silicon carbide | 120 |
| 325 grit size and finer silicon carbide | 120 |
| Boric acid | 15 |

The above raw batch is thoroughly mixed with the addition of 3% by weight Type "O" sodium silicate and moistened with water to suitable consistency and rammed to the desired shaped body. The resulting body is dried and fired in a reducing atmosphere to a temperature of 2000–2500° C. to recrystallize the silicon carbide. The resulting recrystallized silicon carbide body is found to have an electrical resistance at room temperature of $10^6$ ohms. When the resistor body is heated the resistance decreases very rapidly, measuring only 74 ohms at 1400° F.

Examination under the microscope of a recrystallized silicon carbide body in which boron has been introduced into the lattice in accordance with either of the herein described methods reveals an unusual type of recrystallization. The new growth of silicon carbide taking place during the recrystallization shows a definite growth pattern consisting of pure pyramiding hexagonal layers of crystalline material. This form of recrystallization structure is unusual and indicates that the boron additive facilitated or assisted the process of recrystallization. The resulting recrystallized silicon carbide resistance bodies have a high "B" characteristic, a value of 5000 being typical as contrasted to an extremely low and variable "B" characteristic for unmodified, recrystallized silicon carbide bodies. The "B" characteristic is a measure of the sensitivity of the resistance of the body to temperature change over a given range of temperature. It is calculated from the formula $$B = \frac{2.303 \log \frac{R_1}{R_2}}{\frac{1}{T_1} - \frac{1}{T_2}}$$

wherein $R_1$ equals the resistance in ohms at temperature ($T_1$) and $R_2$ equals the resistance in ohms at temperature ($T_2$) and $T_1$ and $T_2$ are temperatures in degrees Kelvin.

The sole figure of the drawing is a graph showing the effect of the boron additive upon the electrical-resistance characteristics of a recrystallized silicon carbide body made from silicon carbide containing the additive (curve A) as compared to a similar recrystallized silicon carbide body made from unmodified high purity silicon carbide material (curve B). It is noted that the recrystallized silicon carbide resistance body made from the boron-modified silicon carbide crystalline structure has a very high negative temperature coefficient of electrical resistance over a wide temperature range. In other words, the "B" value is high.

The hereindescribed process is subject to many modifications in individual detail without departing from the true scope or spirit of the invention. For example, the silicon carbide from which the body is formed can be made up of other combinations and proportions of grit sizes of silicon carbide, and temporary binders other than sodium silicate can be used, such as silicones or other organic resinous binders, and adhesive substances commonly used for such purposes. Also, other conventional forming methods can be used for molding the shaped bodies, such as tamping, jolting, extruding and the like. When the bodies are formed by a method requiring greater plasticity of the raw batch, small amounts of glycerine or other plastifiers can be used to impart the desired degree of plasticity to the mix.

The bodies can be molded to any desired form or size depending upon the particular end use or application in mind including such common shapes as beads, wafers, discs, rods and bars, and when required for mounting or otherwise embodying in an electrical circuit, can be provided with metallized terminal portions and attached connecting wires in accordance with standard practices for securing lead wires to non-metallic bodies.

Having described the invention in detail it is desired to claim:

1. A thermistor body composed of a recrystallized body of silicon carbide modified by the presence throughout the body of a small but effective amount up to 0.34% of boron sufficient in amount to impart to said recrystallized body a high negative temperature coefficient of electrical resistance several times greater than that of a recrystallized body of pure silicon carbide.

2. A thermistor body consisting essentially of a recrystallized body of silicon carbide in which the crystal lattice of the silicon carbide contains a small but effective amount up to 0.34% boron.

3. A resistance body composed of a recrystallized body of silicon carbide and containing within the crystal lattice of the silicon carbide a sufficient amount of boron to impart to said body a high negative temperature coefficient of electrical resistance several times greater than that of a recrystallized body of pure silicon carbide.

4. A resistance body having a high negative temperature coefficient of electrical resistance, said body being composed of a recrystallized body of silicon carbide containing a small but effective amount up to 0.34% boron in the crystal lattice, said boron being sufficient in amount to impart a high negative temperature coefficient of electrical resistance to said body.

5. A method of making a recrystallized silicon carbide thermistor body which comprises forming a body of the desired shape from a mixture of boron-modified silicon carbide granules and firing said shape to a temperature of 2000–2500° C. to recrystallize the silicon carbide thereof.

6. A method of making recrystallized silicon carbide thermistor bodies which comprises forming a body of the desired shape from a mixture of silicon carbide particles and a small amount of a boron compound, and firing the resulting shape to a temperature of 2000–2500° C. to recrystallize the silicon carbide and introduce the boron into the silicon carbide crystal structure.

7. A thermistor body consisting essentially of a recrystallized body of silicon carbide and containing within the crystal lattice of the silicon carbide about 0.20 to about 0.34% by weight boron, said body having a high negative temperature coefficient of electrical resistance several times gerater than that of a recrystallized body of pure silicon carbide.

8. A method of making a recrystallized silicon carbide thermistor body which comprises forming a body of the desired shape from a mixture of boron-modified silicon carbide granules containing about 0.20 to about 0.34% by weight boron in the crystal lattice, and firing said shape to a temperature of about 2000–2500° C. to recrystallize the silicon carbide thereof.

9. A method of making recrystallized silicon carbide thermistor bodies which comprises forming a body of the desired shape from a mixture of silicon carbide particles and a sufficient but small amount of a boron compound to provide about 0.20 to about 0.34% by weight boron in the lattice of the silicon carbide when recrystallized, and firing the resulting shape to a temperature of 2000–2500° C. to recrystallize the silicon carbide and introduce the boron into the silicon carbide crystal structure.

References Cited in the file of this patent

UNITED STATES PATENTS

| | | |
|---|---|---|
| 864,723 | Bolling | Aug. 27, 1907 |
| 1,019,568 | Weintraub | Mar. 5, 1912 |
| 1,349,053 | Feild | Aug. 10, 1920 |
| 1,742,259 | Kelleher | Jan. 7, 1930 |
| 1,841,537 | Kelleher | Jan. 19, 1932 |
| 2,445,296 | Wejnarth | July 13, 1948 |